UNITED STATES PATENT OFFICE.

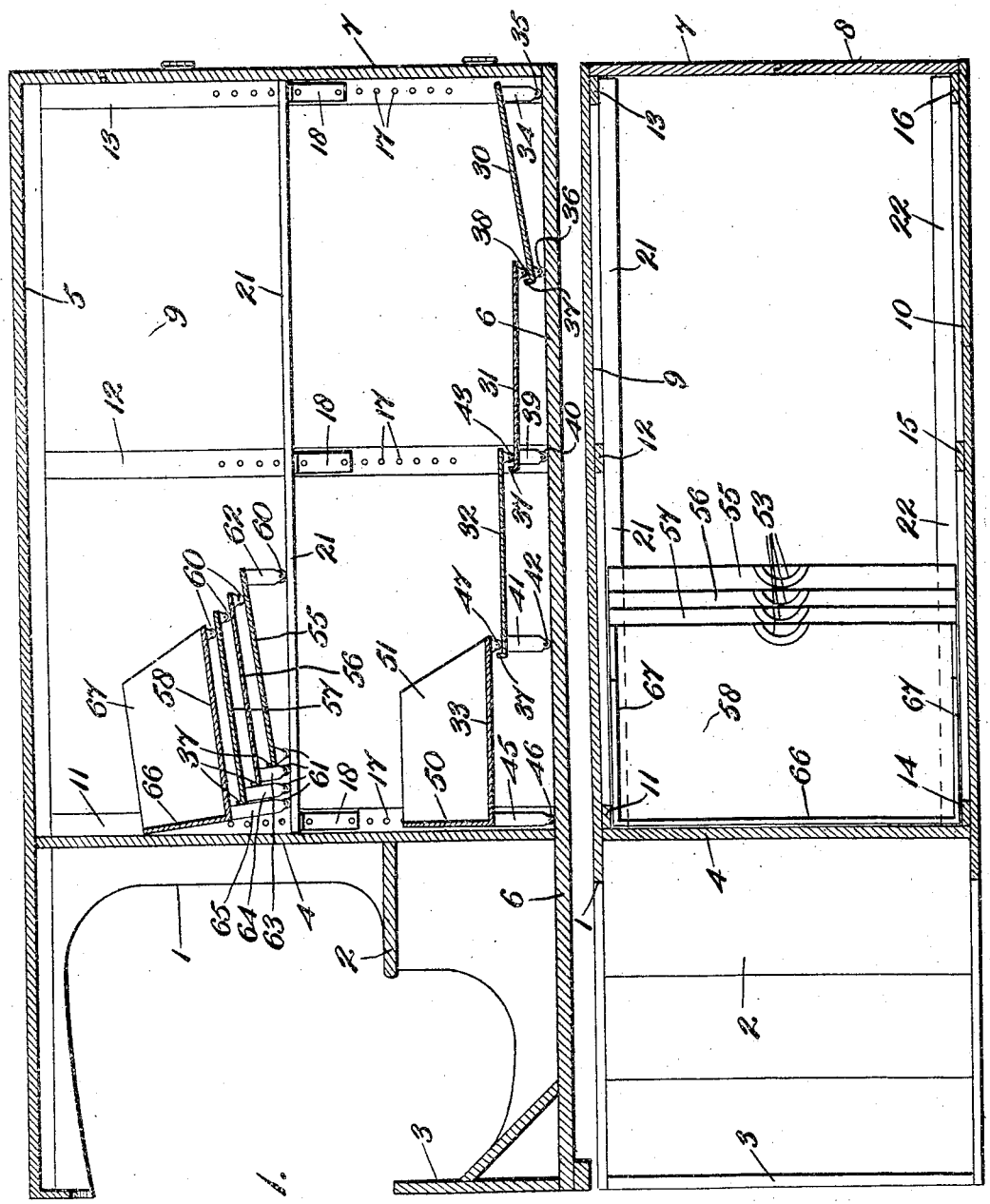

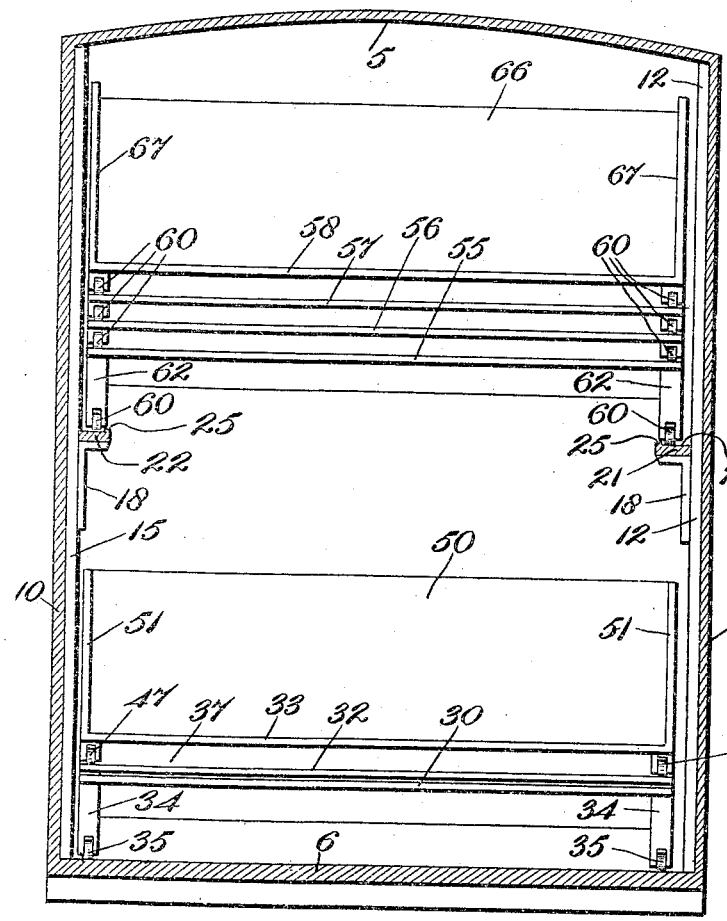
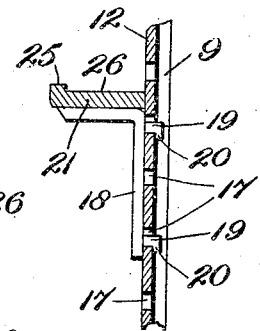

ROBERT E. GREENE, OF MEMPHIS, TENNESSEE.

DELIVERY-VEHICLE BODY.

1,240,704.   Specification of Letters Patent.   Patented Sept. 18, 1917.

Application filed December 2, 1916. Serial No. 134,728.

*To all whom it may concern:*

Be it known that I, ROBERT E. GREENE, a citizen of the United States, residing at Memphis, in the county of Shelby and State of Tennessee, have invented certain new and useful Improvements in Delivery-Vehicle Bodies; and I do hereby declare the following to be a full, clear, and exact description of the invention, such as will enable others skilled in the art to which it appertains to make and use the same.

This invention relates to vehicle bodies, especially adapted for use on heavy delivery cars or trucks and has for its object to provide a body of this kind with adjustable means by which goods may be loaded into and delivered from said bodies without having to enter the same, and in a manner more convenient and expeditious than has been heretofore proposed.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:—

Figure 1 is a longitudinal sectional view of a vehicle body made in accordance with this invention;

Fig. 2 is a sectional plan view of the parts shown in Fig. 1;

Fig. 3 is a transverse sectional view of the parts shown in Fig. 1; and

Fig. 4 is an enlarged detail sectional view showing the construction by which the adjustable supporting tracks are secured to the vehicle body.

1 indicates any suitable vehicle body provided with a driver's seat 2, a dash-board 3, a partition 4 back of the driver's seat, a top portion 5, and a bottom 6, and rear closure preferably composed of the hinged doors 7 and 8. The sides 9 and 10 of the body 1 are provided with the supporting strips or members 11, 12, 13, 14, 15 and 16. Said supporting members are provided with the holes or perforations 17 into which the holding members 19 of the adjustable brackets 18 may fit. The said holding members 19 are preferably of the L-shape shown, and are therefore each provided with a holding flange or lip 20 as illustrated, in order that each bracket 18 may be held to its corresponding supporting strip such as 12 for example. Located and supported by one set of brackets 18 on one side of the vehicle body is the supporting track 21 and located and supported by the other set of brackets 18 on the other side of the vehicle body is a similar supporting track 22 all as will be clear from Fig. 3, of the drawings. Each track 21 and 22 may be readily adjusted up and down with its corresponding brackets 18 by merely raising the said brackets 18 to disengage the holding flanges or lips 20 of the holding members 19 from the orifices 17 and then removing said members 19 from said orifices and reinserting the said members 19 in other orifices at the height desired to adjust the said tracks 21 and 22. Each track 21 and 22 is preferably provided with an upwardly extending lip 25 and with a track surface 26 on which rests the rollers such as 60 carried by the legs of the trays to be presently disclosed.

On the bottom 6 of the vehicle body 1 rests a plurality of trays such as 30, 31, 32 and 33. The body of the tray 30 is preferably inclined as shown and at its rear edge is provided with the leg or support 34 having the roller 35. The front end of said tray 30 is provided with the roller 36 which is not spaced from the bot... portion 30 by a leg as is the roller 35 and therefore, the forward edge of the said tray 30 dips down or is inclined toward the bottom 6 of the vehicle body for a purpose to be disclosed below. The extreme forward edge of each of the trays 30, 31, and 32 is provided with an upturned lip or extension 37 and the top surface of the tray 30 is traversed by a roller 38 which is located near the body of the tray 31 and which is adapted to contact with the upturned lip 37 of the tray 30 as will be clear from the drawings. The forward edge of the tray 31 is provided with a leg 39 carrying a roller 40 which leg and roller serve to support the tray 31 substantially parallel with the bottom 6 of the said body 1. In like manner the forward edge of the tray 32 is provided with a leg 41 and a roller 42 adapted to support said tray 32 substantially parallel to said bottom 6 and its rear edge is provided with a roller 43 adapted to traverse the top surface of the tray 31 and come in contact with the lip 37 of said last mentioned tray when the parts are in their extended position as illustrated. In the same way the tray 33 at its forward end is provided with a leg 45 and a roller 46 adapted to traverse the bottom 6 of the body 1 and to support the body of the tray 33 substantially parallel to said bottom 6. In like manner the rear edge of the tray 33 is provided with a roller 47 adapted to traverse the top surface of the tray 32 and to come in contact with the lip 37 of said tray 32. The forward edge of the tray 33 is provided with the front wall 50 and said tray 33 is also provided with side walls such as 51.

The said trays 30, 31, 32 and 33 extend from side to side of the vehicle body 1 as will be clear in connection with the upper tier of trays illustrated in Fig. 2, and they are, or may be, each provided with the cutaway portions 53 as also illustrated in connection with the upper tier of trays shown in Fig. 2, in order to form convenient hand holes or other means of pulling them in and out. Riding on the tracks 21 and 22 and likewise extending from side to side of the vehicle body is the above mentioned upper tier of trays 55, 56, 57, and 58, each of which is provided with the rear rollers 60 and the front rollers 61 as indicated. The bottom tray 55 is further provided with a supporting leg 62 which serves to incline its top surface as shown and the front edges of the said trays 56, 57 and 58 are respectively provided with the legs 63, 64 and 65 which are of just the right height to cause the bottoms of said trays to occupy a horizontal position when this said upper series of trays is spread out, as will be clear from the bottom series of trays illustrated in Fig. 1. In said Fig. 1 the top series of trays lettered from 55 to 58 are shown in a nested position but of course they are adapted to be extended as illustrated in connection with the bottom series of trays and the tray 58 is provided at its forward edge with the front wall 66 and is likewise provided with the side walls such as 67 so that it is in all respects similar to or a duplicate of the said tray 33.

The operation of the invention will be clear from the foregoing, but may be briefly summarized as follows:

Owing to the lips 37 with which each of the trays is provided and owing to the fact that the forward lip 37 of one tray will contact with the rear rollers such as 38 of an adjacent tray, it is an easy matter by pulling out a rear tray such as 30 to pull back toward the rear of the vehicle body all of the trays one at a time, and thus to consecutively load the trays without having to enter the wagon. In other words, a front tray such as 33 or 58 may be loaded and pushed ahead out of the way whereupon a succeeding tray such as 57 or 32 may be next loaded and pushed ahead and so on until all of the trays have been loaded. The rear trays such as 30 and 55 are inclined as shown so as to lessen the tendency of the goods to fall out of the wagon body when the rear doors 6 and 8 are opened. When it is desired to clear the vehicle body of the trays they can either be taken entirely out of the said body or else they can be nested at the forward end of the body as illustrated in Fig. 1.

When it is desired to accommodate large packages in the vehicle body, the upper tier of trays can be adjusted to a greater height above the floor 6 by moving the brackets 18 and tracks 21 and 22 to the proper height or said trays may be entirely removed from the wagon body. Again should it be desired to only use the lower set of trays the upper set can be removed from the wagon body leaving the tracks 21 and 22 in place or they can be nested as illustrated, thus leaving only the lower set to facilitate the removal of the goods. In like manner, of course the lower set of trays can be removed from the vehicle body in order to accommodate very large or heavy packages on the bottom 6 and the upper set of trays can be used for lighter packages. In all cases any desired number of trays may be employed and when the vehicle body is too long to reach a lower tray such as 55 from the rear end of the body, a string or other additional attachment not shown can be attached thereto and kept in convenient reach of the driver. Further when it is desired of course side doors or a front door not shown may be provided in the vehicle body 1.

In all cases no matter how long the vehicle body may be, the trays can thus be conveniently manipulated by the driver without his being under the necessity of entering said vehicle body.

In other words, this particular type of body when supplied with the trays disclosed provides a wagon suitable for handling either retail packages or wholesale packages, or both.

Another important feature of the invention resides in the fact that it is not necessary to provide either front or side doors to the vehicle body, although as above stated there is no objection to providing such doors should they be desired. At the same time the wagon or car may be readily employed for any kind of merchandise for which it is adapted to handle.

For example, should it be desired to have a plain smooth body inside, it is only necessary to remove the trays and brackets 18 and tracks 21 and 22 whereupon the car can be used as an ordinary car.

It is obvious that those skilled in the art may vary the details of construction as well as the arrangement of parts without departing from the spirit of the invention, and therefore I do not wish to be limited to the above disclosure except as may be required by the claims.

What I claim is:

1. In a delivery vehicle body the combination of side walls; vertically disposed supports having perforations associated with said walls; longitudinally disposed tracks associated with said supports and walls; means for adjusting said tracks up and down comprising holding brackets having L shaped members provided with holding lips; a plurality of trays extending from side to side of said body resting on and movable over said tracks; and means associated with said trays by which they are adapted to nest the one with the other, substantially as described.

2. In a delivery vehicle body the combination of side walls; vertically disposed supports associated with said walls; longitudinally disposed tracks associated with said supports and walls; means comprising brackets for adjusting said tracks up and down; a plurality of trays extending from side to side of said body resting on and movable over said tracks; and means located at the rear of one tray and at the front of a succeeding tray adapted to connect the trays when pulled out, and to permit them to nest when pushed together, substantially as described.

3. In a delivery vehicle body the combination of side walls, vertically disposed perforated strips on the inside of said walls; adjustable brackets having members entering the perforations in said strips; tracks supported on said brackets; a plurality of trays provided with front supports resting on and movable over said tracks; extensions on the front edges of some of said trays; supports on the rear edges of the same trays, the said extensions adapted to engage the said last named supports when the series of trays is extended, and the said last named supports of the forward trays adapted to traverse the top surfaces of the succeeding or rear trays when the series of trays are nested, substantially as described.

4. In an apparatus of the class described the combination of a delivery vehicle body, and a series of nesting trays extending from side to side of said body and from end to end thereof when the trays are in their extended positions, each of said trays provided with a front and a rear support, the rear support of the rear tray being of such dimensions relative to its front support that the body of the tray will be normally inclined to the bottom of the vehicle body, and the intermediate trays of the series provided with front extensions adapted to engage the rear supports of their corresponding front trays and thereby limit the extensibility of the series while permitting the ready nesting of the same, substantially as described.

5. In a nest of trays for use in delivery vehicle bodies, the combination of a plurality of trays; front and rear supports on each tray, the front support of each tray except the last being higher than its own rear support, and higher than the front support of its associated rear or succeeding tray in the series, while the rear support of the last tray is higher than its own front support; and extensions on the front edges of each tray except the first in the series, adapted to engage the corresponding rear supports of preceding trays when the series is extended, and to slide under said preceding trays when the trays are in their nested positions, substantially as described.

In testimony whereof I affix my signature, in presence of two witnesses.

ROBERT E. GREENE.

Witnesses:
 ABE GOODMAN,
 C. S. EBERHART, Jr.

Copies of this patent may be obtained for five cents each, by addressing the "Commissioner of Patents, Washington, D. C."